(12) United States Patent
Mee et al.

(10) Patent No.: US 12,480,275 B1
(45) Date of Patent: Nov. 25, 2025

(54) AUTOMATED RISING CONCRETE TRACKING DEVICE

(71) Applicant: University of South Florida, Tampa, FL (US)

(72) Inventors: Tristen Edward Mee, Brooksville, FL (US); Austin Gray Mullins, Bradenton, FL (US)

(73) Assignee: University of South Florida, Tampa, FL (US)

( * ) Notice: Subject to any disclaimer, the term of this patent is extended or adjusted under 35 U.S.C. 154(b) by 462 days.

(21) Appl. No.: 17/983,990

(22) Filed: Nov. 9, 2022

Related U.S. Application Data

(60) Provisional application No. 63/263,800, filed on Nov. 9, 2021.

(51) Int. Cl.
  E02D 33/00 (2006.01)
  E02D 27/12 (2006.01)
  (Continued)

(52) U.S. Cl.
  CPC .............. E02D 33/00 (2013.01); G01B 3/12 (2013.01); G01L 1/22 (2013.01); G01L 5/106 (2013.01);
  (Continued)

(58) Field of Classification Search
  CPC . E02D 33/00; E02D 27/12; E02D 2250/0023; E02D 2300/002;
  (Continued)

(56) References Cited

U.S. PATENT DOCUMENTS

| 4,437,337 A | * | 3/1984 | Fenrick | G01N 11/00 73/54.01 |
| 4,715,726 A | | 12/1987 | Tsuruta | |

(Continued)

FOREIGN PATENT DOCUMENTS

| CN | 101464177 A | * | 6/2009 |
| CN | 204781021 U | * | 11/2015 |
| CN | 115030040 A | * | 9/2022 |

OTHER PUBLICATIONS

Jeramy C. Ashlock et al. "Thermal Integrity Profiling and Crosshole Sonic Logging of Drilled Shafts with Artificial Defects" Geo-Congress Technical Papers. 2014, pp. 1795-1805.

(Continued)

*Primary Examiner* — Jonathan M Dunlap
(74) *Attorney, Agent, or Firm* — Anton J. Hopen; Trenam Law (57) ABSTRACT

Described herein relates to a system and method of verifying a dimension in real-time of a foundation being poured during construction. The dimension monitoring apparatus may automate and/or expedite a measurement of a foundation during pouring. As such, the dimension monitoring apparatus may simultaneously monitor a flow of concrete via at least one pump stroke and/or at least one flow meter, in addition to a rising concrete level using at least one motor assembly. Additionally, the dimension monitoring apparatus may comprise a probe configured to track the level of the rising foundation throughout the entire foundation pouring process. The dimension monitoring apparatus may continuously track and/or refine a dimension and/or depth profile of a foundation and/or may identify potential anomalous cross sectional dimensions which may have occurred during the foundation pouring process.

15 Claims, 10 Drawing Sheets

(51) Int. Cl.
  *G01B 3/12* (2006.01)
  *G01L 1/22* (2006.01)
  *G01L 5/106* (2020.01)
(52) U.S. Cl.
  CPC ...... *E02D 27/12* (2013.01); *E02D 2250/0023* (2013.01); *E02D 2300/002* (2013.01); *E02D 2600/10* (2013.01)
(58) Field of Classification Search
  CPC ......... E02D 2600/10; G01B 3/12; G01L 1/22; G01L 5/106
  See application file for complete search history.

(56) References Cited

U.S. PATENT DOCUMENTS

| | | | |
|---|---|---|---|
| 4,813,275 A * | 3/1989 | Castor | G01F 23/0038 73/309 |
| 5,041,987 A | 8/1991 | Kuwahara et al. | |
| 6,783,273 B1 | 8/2004 | Mullins et al. | |
| 2016/0060083 A1* | 3/2016 | Klinke | B66D 1/505 414/800 |

OTHER PUBLICATIONS

Wen Deng et al. "Fiber Optic-Based Thermal Integrity Profiling of Drilled Shaft: Inverse Modeling for Spiral Fiber Deployment Strategy" Materials. Sep. 17, 2021, 14, 5377.

* cited by examiner

AUTOMATED RISING CONCRETE TRACKING DEVICE

CROSS-REFERENCE TO RELATED APPLICATIONS

This nonprovisional application is a continuation of and claims the benefit of U.S. Provisional Application No. 63/263,800 entitled "AUTOMATED RISING CONCRETE TRACKING DEVICE" filed Nov. 9, 2021 by the same inventors, all of which is incorporated herein by reference, in its entirety, for all purposes.

BACKGROUND OF THE INVENTION

1. Field of the Invention

This invention relates, generally, to concrete integrity testing. More specifically, it relates to a system of and method for verifying a dimension, in real-time, of a foundation being poured, during construction.

2. Brief Description of the Prior Art

During the construction of drilled shafts, it is important to verify shaft dimensions during cement curing to assess the quality of the drilled shaft and/or bored pile after construction. In order to verify the shaft dimensions, current practices require the use of Thermal Integrity Profiling (hereinafter "TIP"). As such, TIP requires the use of heat generated by curing cement to then assess the quality of the drilled shafts. In this manner, the maximum temperature required to determine the shaft radius is dependent on the diameter, the concrete mix design, and the time of measurement relative to the concrete casting. Additionally, measured temperatures at the reinforcement cage varies with the distance to the center of the shaft and with the concrete cover. However, TIP requires multiple days to reach maximum temperature, in order to accurately calculate the radius of the shaft. It does not allow for immediate correction of the shaft if the radius is larger or smaller than originally designed, leading to additional delays and expenses on the construction site, as the shaft would have to be remove and replaced in order to correct the radius length.

Accordingly, what is needed is safe, efficient, non-destructive and easy to use system and method for calculating at least one dimension of a foundation in real-time during pouring of the foundation. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need, stated above, is now met by a novel and non-obvious invention disclosed and claimed herein. In an aspect, the present disclosure pertains a dimension monitoring apparatus for verifying, in real-time, a dimension of a foundation being poured during construction. In embodiments, the dimension monitoring apparatus may comprise the following, including but not limited to: (a) a spool having a distal portion and a proximal portion separated by a first distance; (b) a cable moveably connected to the spool, in which the cable may be configured to be retained within the first distance of the spool, such that the cable may comprise a proximal end and a distal end; (d) a probe temporarily affixed to the distal end of the cable, such that at least one portion of the probe may be configured to engage at least one surface of the foundation; (e) a rotary encoder comprising at least one wheel, in which the at least one wheel may be configured to be in contact with at least one portion of the cable, such that a relative linear distance and/or relative direction of the at least one portion of the cable may be recorded in real-time via passive tracking by the clockwise rotation and/or counterclockwise rotation of the at least one wheel as the cable extends, retracts, and/or bobs; (f) a tension sensor comprising at least one pulley, in which the at least one pulley may be configured to be in contact with at least one portion of the cable, such that the at least one pulley may be is temporarily affixed to at least one spring, such that when the at least one portion of the probe is disengaged with the at least one surface of the foundation, the at least one spring may be configured to decompress, translating the at least one pulley toward a limit switch of the tension sensor, and when the at least one pulley arrives at a predetermined end position, a circuit of the limit switch may be closed; (g) a motor assembly configured to be in mechanical communication with the spool, in which the motor assembly may be configured to extend, retract, and/or bob the cable, via rotatably translating the spool; (h) an electronic circuitry, in which the electronic circuitry may be configured to selectively supply an electric current the rotary encoder and/or the tension sensor; and (i) a processor in electrical communication with the electronic circuitry and/or the motor assembly, such that the processor may be configured to actuate the motor assembly and/or may be configured to cause the electronic circuitry to supply the electric current to the rotary encoder and/or the tension sensor, causing the cable to extend, retract, and/or bob at a predetermined speed, such that the probe engages and/or disengages with the at least one surface of the foundation, closing and/or opening the circuit of the limit switch and/or causing the tension sensor and/or the rotary encoder to send at least one electrical signal to the processor.

In some embodiments, the dimension monitoring apparatus may further comprise a computing device which may be configured to be in electrical communication with the processor, such that the processor may be configured to transmit the at least one electric signal of the tension sensor and/or the rotary encoder to a memory of the computing device. Additionally, in these other embodiments, the processor may be configured to calculate at least one dimension of the foundation, in real-time, based on the electrical signal of the tension sensor and/or the rotary encoder. In this manner, the dimension monitoring apparatus may further comprise a display device associated with the computing device, such that the processor may be configured to display a graphical interpretation of the at least one calculated dimension of the foundation, in real-time.

In some embodiments, the probe may also be configured to input a tension into the cable as the probe is disengaged with the at least one surface of the foundation. In these other embodiments, the at least one wheel of the rotary encoder may comprise at least 1200 steps per revolution.

Furthermore, in some embodiments, the foundation may be poured at a depth of at least 100 ft. As such, in these other embodiments, the dimension monitoring apparatus may further comprise a cantilevered beam comprising at least one strain gauge disposed about at least a portion of the cantilevered beam, such that the strain gauge may be configured to record an amount of flex and/or strain of the cantilevered beam as the probe engages and/or disengages with the at least one surface of the foundation. Moreover, in these other embodiments, responsive to a force being exerted on the cantilever beam, the processor may be configured to be in electrical communication with the at least one strain gauge of the cantilevered beam, such that the processor may be configured to transmit the recording of the strain gauge to the computing device, and whereby the computing device is configured to display the graphical interpretation of the recording on the display device, in real-time.

In some embodiments, the dimension monitoring apparatus may further comprise, at least one strain gauge disposed about at least a portion of a foundation hose, such that the at least one strain gauge may be configured to record an amount of flex and/or strain of the foundation hose. In addition, in these other embodiments, responsive to a force being exerted on the foundation hose, the processor may be configured to be in electrical communication with the at least one strain gauge of the foundation hose, such that the processor may be configured to transmit the recording of the strain gauge to the computing device. In this manner, the computing device may be configured to display the graphical interpretation of the recording on the display device, in real-time.

Additionally, in another aspect, the present disclosure pertains to a method for verifying, in real time, a dimension of a foundation being poured during construction. In embodiments, the method may comprise the following, including but not limited to: (a) temporarily affixing a probe to a distal end of a cable of a dimension monitoring apparatus comprising a spool, such that the cable may be moveably connected to the spool, and in which the spool may be in mechanical communication with a motor assembly, such that the motor assembly may be configured to extend, retract, and/or bob the cable, via rotatably translating the spool, through at least one wheel of a rotary encoder and/or at least one pulley of a tension sensor of the dimension monitoring apparatus; (b) extending, via the motor assembly, the cable away from the spool toward the foundation, such that when at least one portion of the probe engages with at least one surface of the foundation, a supply of an electric current to the motor assembly may cease, causing the cable to cease translating; and (c) retracting, via the motor assembly, the cable toward the spool, wherein subsequent to the at least one portion of the probe engaging with the at least one surface of the foundation, the supply of electric current to the motor assembly may be provided, such that the rotation of the motor assembly may be reversed, thereby causing the cable to begin translating toward the spool.

In these embodiments, the rotary encoder may be configured to transmit an electric signal as at least a portion of the cable translates over the at least one wheel of the rotary encoder. Moreover, in these embodiments, when the at least one portion of the probe engages with the at least one surface of the foundation, the tension sensor may be configured to transmit at least one electric signal.

In some embodiments, the method may further comprise the step of, after retracting the cable toward the spool, reextending, via the motor assembly, the cable away from the spool toward the foundation, such that subsequent to the prob being retracted a predetermined distance, the supply of electric current to the motor assembly may be provided, such that the rotation of the motor assembly is forward, causing the at least one portion of the probe to reengage with the at least one surface of the foundation, and in which when the at least one portion of the probe reengages with the at least one surface of the foundation, the motor assembly may be deactivated.

In some embodiments, the rotary encoder may be configured to record a relative linear distance and/or relative direction of at least one portion of the cable in real-time via passive tracking by the clockwise rotation and/or counter-clockwise rotation of the at least one wheel as the cable extends, retracts, and/or bobs.

In some embodiments, the method may further comprise the step of, transmitting, via a processor of the dimension monitoring apparatus, the at least one electrical signal of the rotary encoder and/or the at least one electrical signal of the tension sensor to a memory of a computing device. As such, in these other embodiments, the method may further comprise the step of, after transmitting, the at least one electrical signal of the rotary encoder and/or the tension sensor, calculating, via the processor of the dimension monitoring apparatus, at least one dimension of the foundation based on the at least one electrical signal of the rotary encoder and/or the at least one electrical signal of the tension sensor. Accordingly, the method may further comprise the step of, after calculating the at least one dimension of the foundation, displaying, via the processor of the dimension monitoring apparatus, a graphical interpretation, in real-time, of the at least one calculated dimension of the foundation.

In some embodiments, the probe may be configured to input a tension into the cable as the probe is disengaged with the at least one surface of the foundation. In some embodiments, the at least one wheel of the rotary encoder may comprise a steps per revolution of at least 1200 steps per revolution. In some embodiments, the foundation may be poured at a depth of at least 100 ft. In some embodiments, the foundation may comprise concrete and/or any material known in the art used for structural support.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIGS. 6A-6B are a dimension monitoring apparatus in application, according to an embodiment of the present disclosure.

FIG. 10 is a plot depicting a depth profile of a foundation, according to an embodiment of the present disclosure.

FIG. 11A is a plot depicting a control depth profile of a foundation, according to an embodiment of the present disclosure.

FIG. 11B is a plot depicting a radius expansion depth profile of a foundation, according to an embodiment of the present disclosure.

FIG. 11C is a plot depicting a radius reduction depth profile of a foundation, according to an embodiment of the present disclosure.

FIG. 12 is a process flow diagram depicting a method of verifying at least one dimension, in real-time, of a foundation being poured during construction, via a dimension monitoring apparatus, according to an embodiment of the present disclosure.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention. Elements/components shown in diagrams are illustrative of exemplary embodiments of the disclosure and are meant to avoid obscuring the disclosure. Any headings, used herein, are for organizational purposes only and shall not be used to limit the scope of the description or the claims. Furthermore, the use of certain terms in various places in the specification, described herein, are for illustration and should not be construed as limiting.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Definitions

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. The techniques introduced here can be embodied as special-purpose hardware (e.g. circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compacts disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

As used herein, "about" means approximately or nearly and in the context of a numerical value or range set forth means±15% of the numerical.

As used herein, the term "strain gauge" refers to any sensor known in the art configured to measure the amount of strain on a material. The strain gauge may be a quarter-bridge, a half-bridge, and/or a full bridge strain sensor. For ease of reference, the exemplary embodiment described herein refers to quarter-bridge strain sensor, but this description should not be interpreted as exclusionary of other strain sensors.

As used herein, the term "electrical communication" refers to any manner and/or device known in the art in which electrical signals may be propagated from one device to another. Electrical communication may be wires, Bluetooth, and/or radio signals. For ease of reference, the exemplary embodiment, described herein, refers to wires, but this description should not be interpreted as exclusionary of other electrical signal transmitters.

As used herein, the term "mechanical communication" refers to any manner and/or device known in the art in which mechanical force may be propagated from one device to another. Mechanical communication may be attachment components, a motor belt, friction, and/or a drive train. For ease of reference, the exemplary embodiment described herein refers to a belt, but this description should not be interpreted as exclusionary of other mechanical force transmitters.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Dimension Monitoring Apparatus:

The present disclosure pertains to a system of and method for verifying a dimension, in real-time, of a foundation being poured during construction. As shown in FIGS. 1-4, in conjunction with FIG. 8 and FIG. 9, in embodiments, a dimension monitoring apparatus 100 may comprise the following, including but not limited to: (a) a spool 104; (b) a motor assembly 102; (c) a rotary encoder 108; (d) a tension sensor 116; and (e) a probe 138. Motor assembly 102 may comprise at least one motor known in the art which may be configured to extend, retract, and/or bob probe 138. As such, in these embodiments, rotary encoder 108 may be disposed between probe 138 and motor assembly 102, such that when motor assembly 102 extends, retracts, and/or bobs probe 138, rotary encoder 108 may be configured to record the length of a cable 110 down the a shaft in-real time, with respect to foundation 140, and/or motor assembly 102 may be configured to transmit the recorded length to a server, a third-party database, and/or a memory of a computing device in electrical communication with rotary encoder 108.

Figure 1:
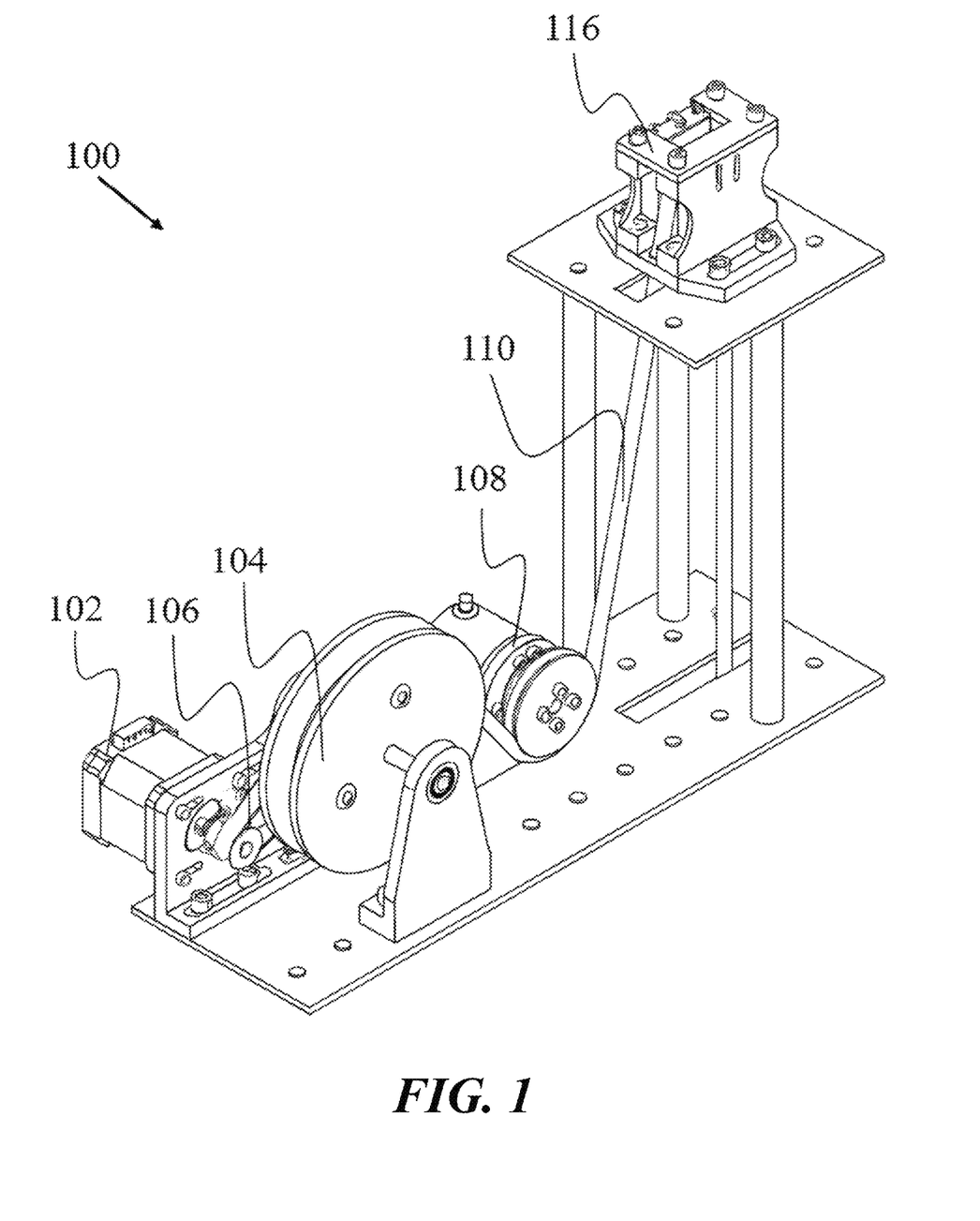
FIG. 1 is a front perspective view of a dimension monitoring apparatus, according to an embodiment of the present disclosure.

Additionally, in embodiments, as shown in FIG. 1, in conjunction with FIG. 4, FIG. 5, FIG. 8, and FIG. 9, dimension monitoring apparatus 100 may comprise at least one pulley 130 affixed to limit switch operator 144, such that cable 110 may be disposed over the at least one pulley 130, compressing at least one spring 132 of tension sensor 116 as probe 138 is suspended. In this manner, once probe 138 touches foundation 140, the at least one spring 132 may be configured to extend, forcing the at least one pulley 130 to activate a limit switch 146, via at least one limit switch operator 144. Accordingly, the extension of the at least one spring 132, such that limit switch 146 may send an electrical communication to the computing device of dimension monitoring apparatus 100, the server, and/or a third-party database, via at least one electrical connector 136.

Figure 2A:
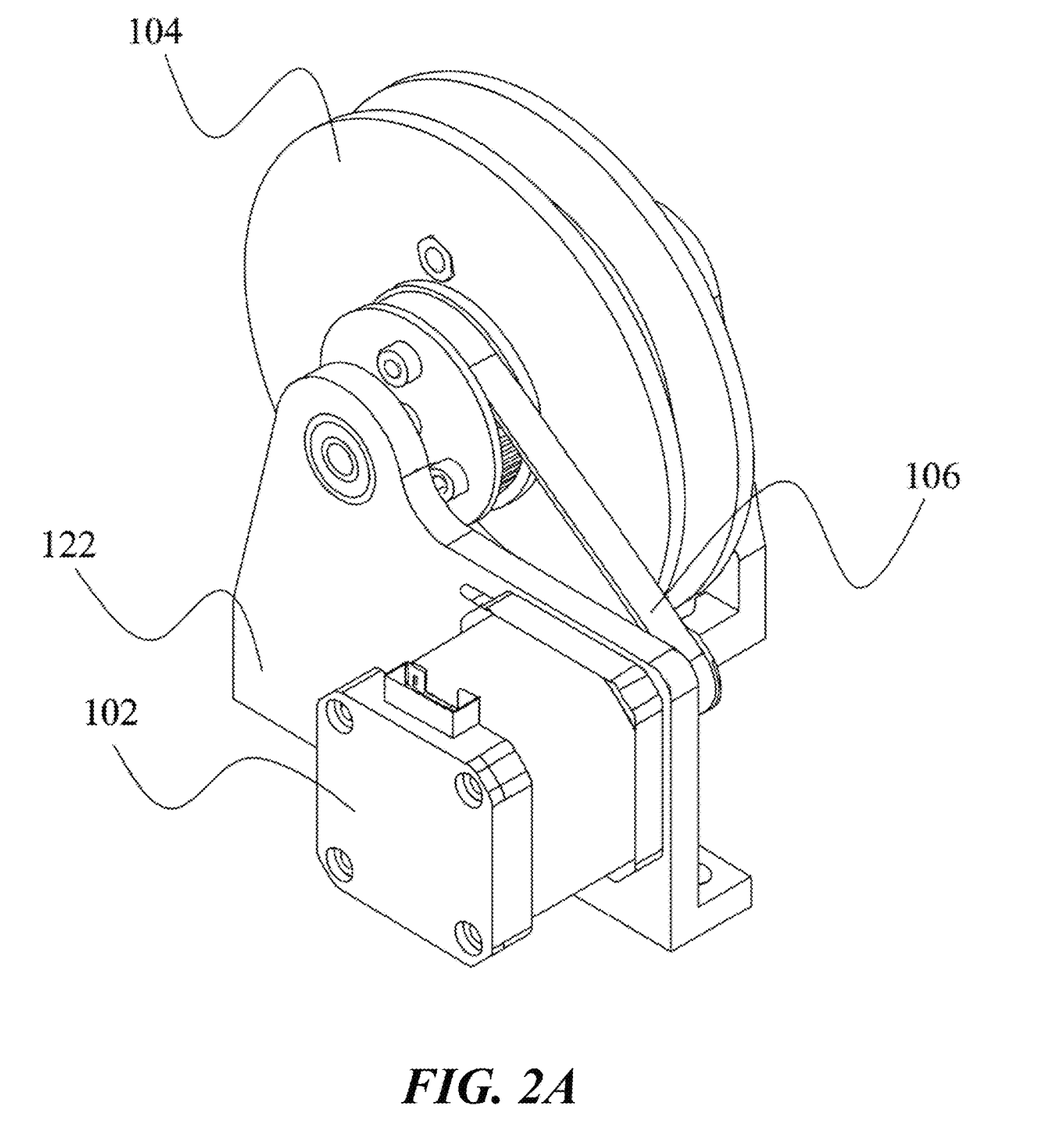
FIG. 2A is a rear perspective view of a motor assembly and a spool of a dimension monitoring apparatus, according to an embodiment of the present disclosure.
Figure 2B:
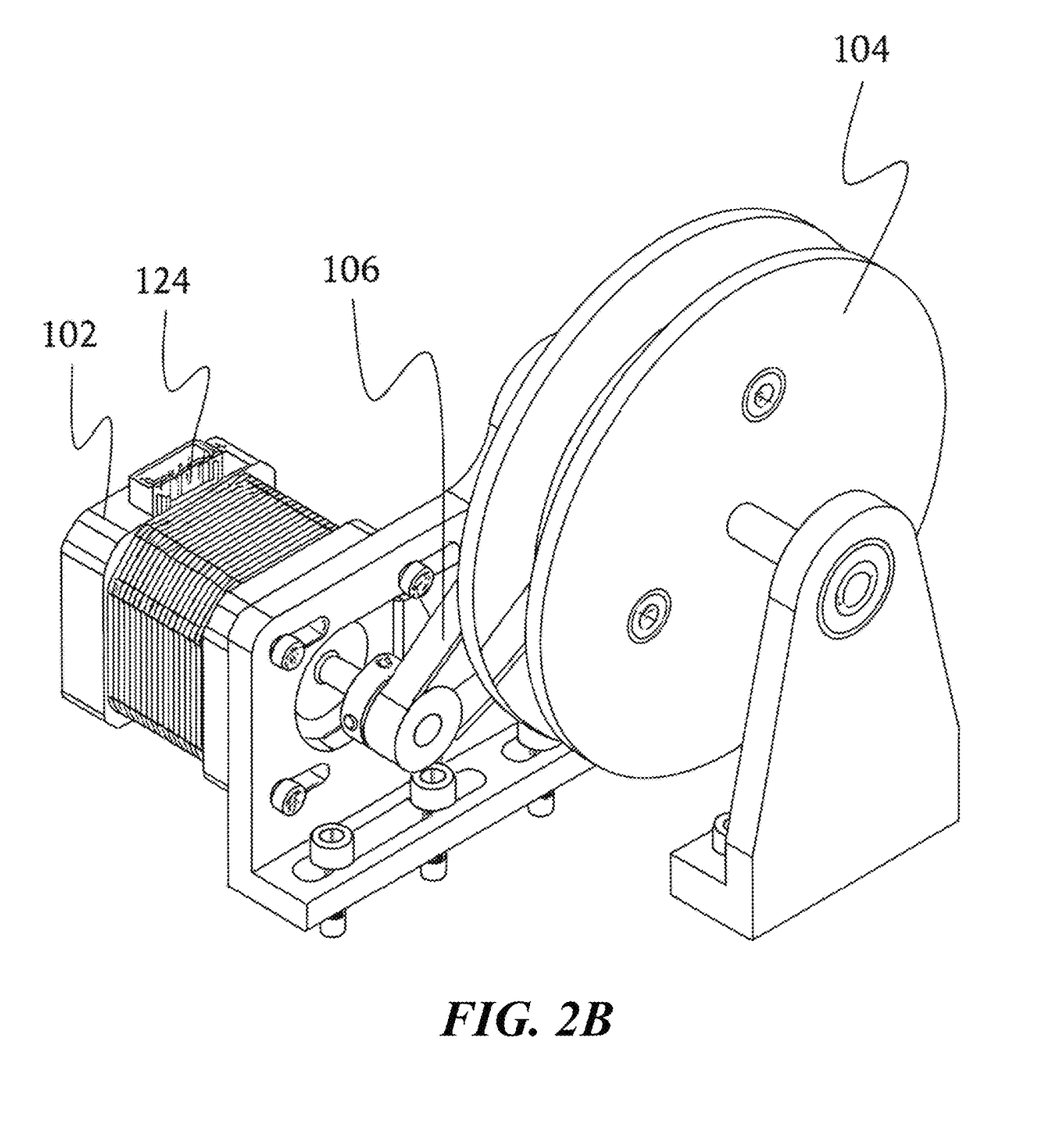
FIG. 2B is a front perspective view of a motor assembly and a spool of a dimension monitoring apparatus, according to an embodiment of the present disclosure.
Figure 8:
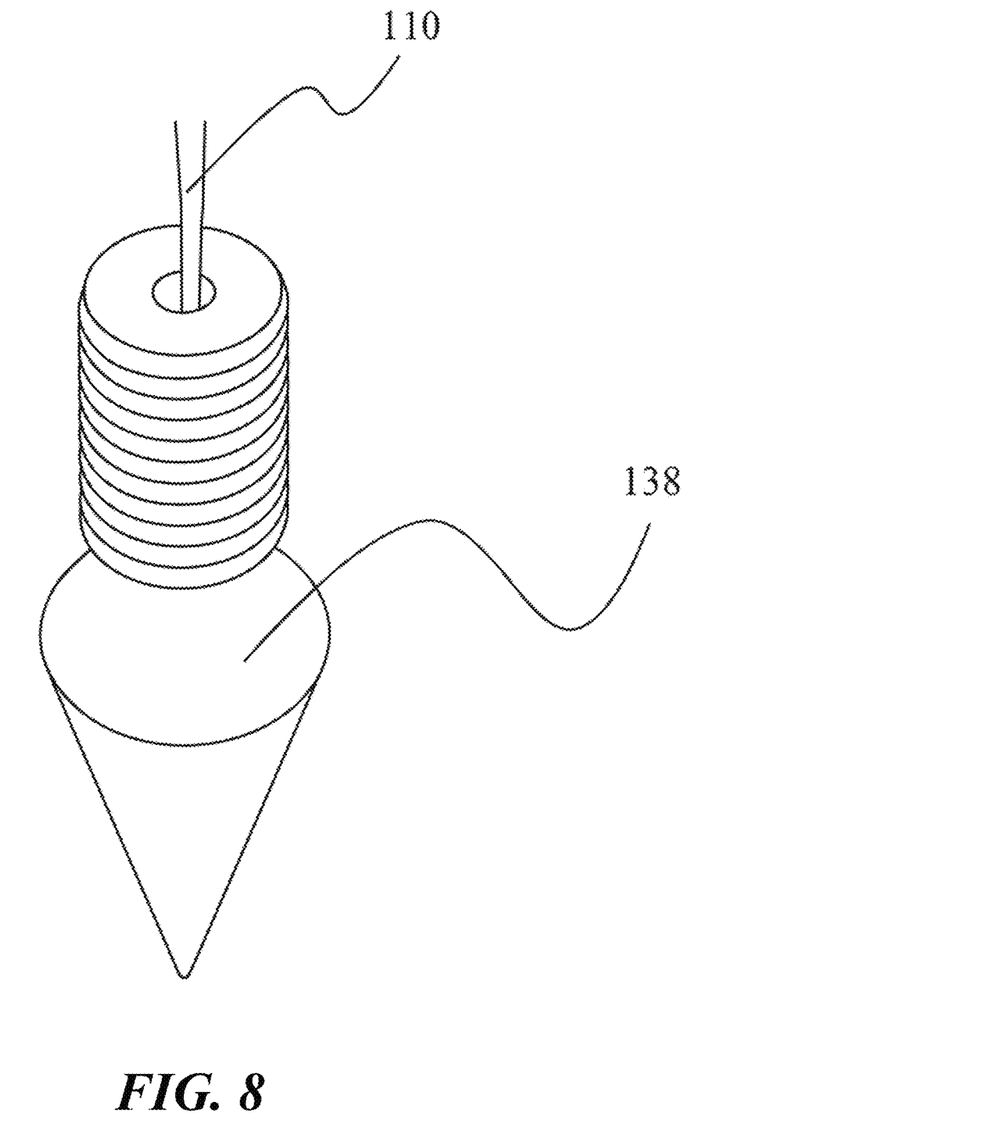
FIG. 8 is a perspective view of a probe of a dimension monitoring apparatus, according to an embodiment of the present disclosure.
Figure 9:
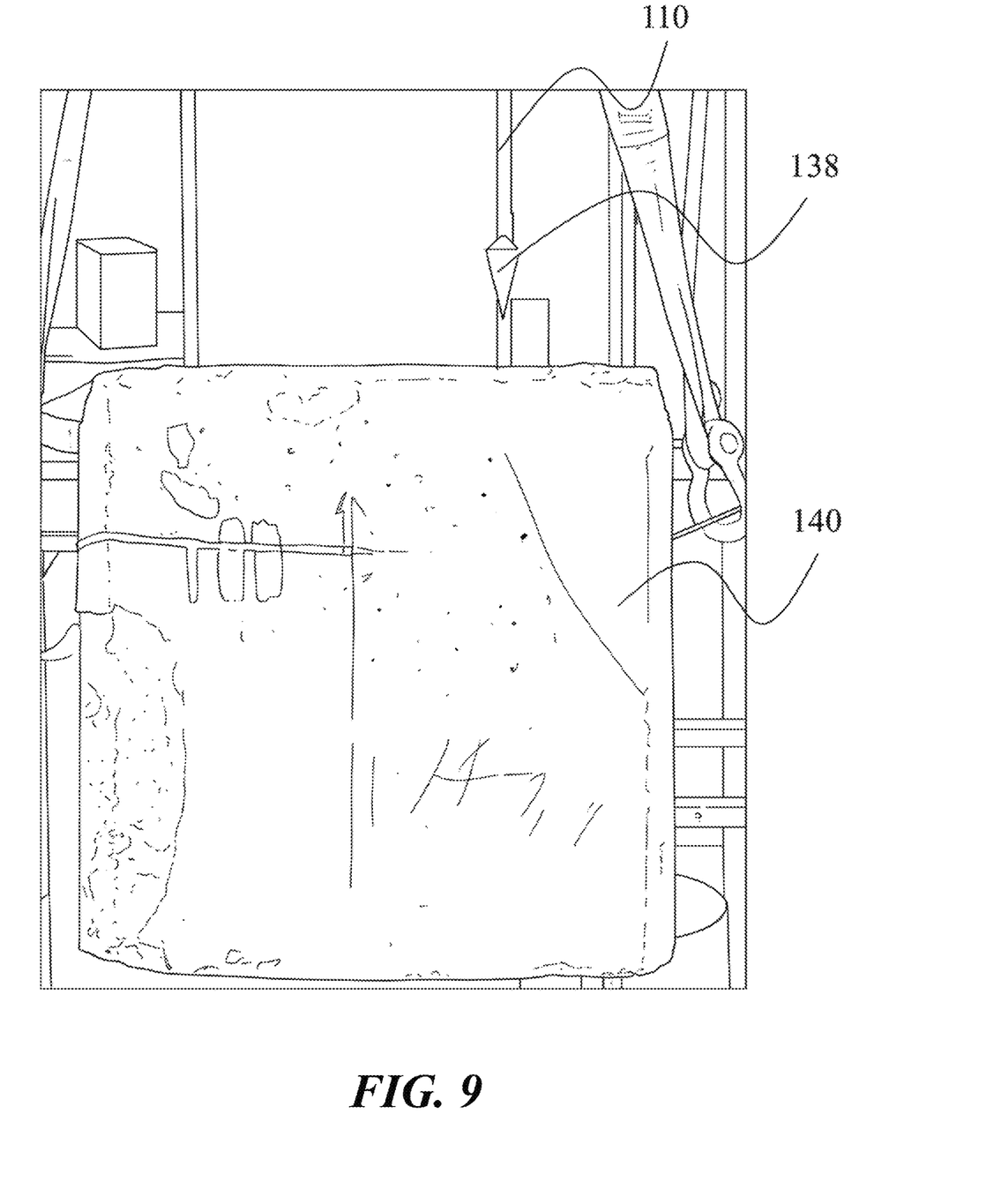
FIG. 9 is a perspective view of a probe of a dimension monitoring apparatus abutting a foundation, according to an embodiment of the present disclosure.

Moreover, in embodiments, as shown in FIG. 2A and FIG. 2B, in conjunction with FIG. 1, FIG. 8, and FIG. 9, motor assembly 102 may comprise at least one motor having a gear ratio comprising a range of at least 1:1 to at most 30:1, encompassing every integer in between. Furthermore, spool 104 may comprise a diameter having a range of at least 0.5 in to at most 10 in, encompassing every integer in between. In addition, in these embodiments, motor assembly 102 comprise at least one belt 106, such that motor assembly 102 may be in mechanical communication with spool 104. In this manner, cable 110 may be configured to be wrapped around spool 104, such that motor assembly 102 may extend, retract, and/or bob probe 138, via applying a rotational force to belt 106, rotating spool 104. In some embodiments, cable 110 may comprise nylon disposed about at least one portion of cable 110. Accordingly, in these other embodiments, motor assembly 104, belt 106, and/or spool 104 may be 3D printed such that motor assembly 102 and spool 104 may be configured to be housed in a 3D printed assembly. As such, in some embodiments, motor assembly 102 and/or spool 104 may be configured to be bolted down to at least one frame, as shown in FIG. 1, such that force lost when transmitted from motor assembly 102 to spool 104 may be negligible.

Figure 3:
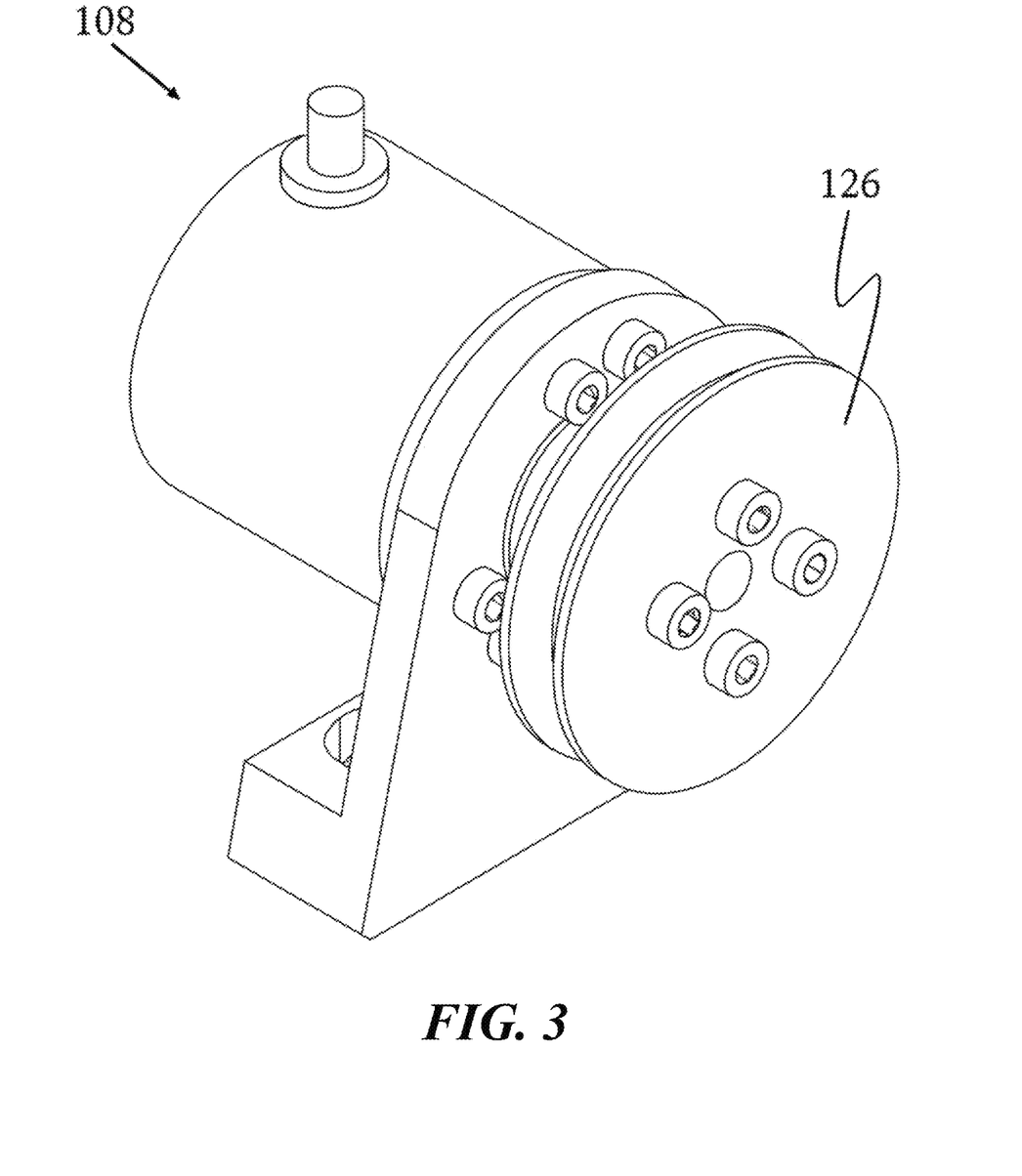
FIG. 3 is a front perspective view of a rotary encoder of a dimension monitoring apparatus, according to an embodiment of the present disclosure.

FIG. 3, in conjunction with FIG. 1, depict rotary encoder 108, according to an embodiment of the present disclosure. As such, in embodiments, rotary encoder 108 may comprise at least one encoder wheel 126, such that cable 110 may be disposed about at least one portion of the perimeter of the at least one encoder wheel 126. In this manner, cable 110 may firmly abut the at least one portion of the at least one encoder wheel 126, allowing the at least one encoder wheel 126, such that the at least one encoder wheel 126 may rotate clockwise and/or counterclockwise based on the extension, retraction, and/or bobbing of probe 138, via cable 110 and motor assembly 102. For example, as the spool and motor assembly wind cable 110 (e.g., extend and/or retract cable 110), rotary encoder 108 may be configured to measure the length of cable 110 that may be expended from the spool 104 and/or motor assembly 102. In this manner, rotary encoder 108 may configured to be in electrical communication with the server, third-party database, and/or the computing device of dimension monitoring apparatus 100, such that the measured length of cable 110 in the shaft at any given time, may be automatically transmitted and/or recorded in the memory of the server, the third-party database, and/or the memory of the computing device. Additionally, rotary encoder 108 comprise at least 250 steps per revolution. For example, in some embodiments, rotary encoder 108 may comprise at least 1200 steps per revolution, resulting in a resolution of at least 0.004 in/step. Moreover, in some embodiments, rotary encoder 108 may be mounted to at least one frame, as shown in FIG. 1. Furthermore, rotary encoder 108 may be 3D printed such that rotary encoder 108 may be configured to be housed in a 3D printed assembly.

Figure 4:
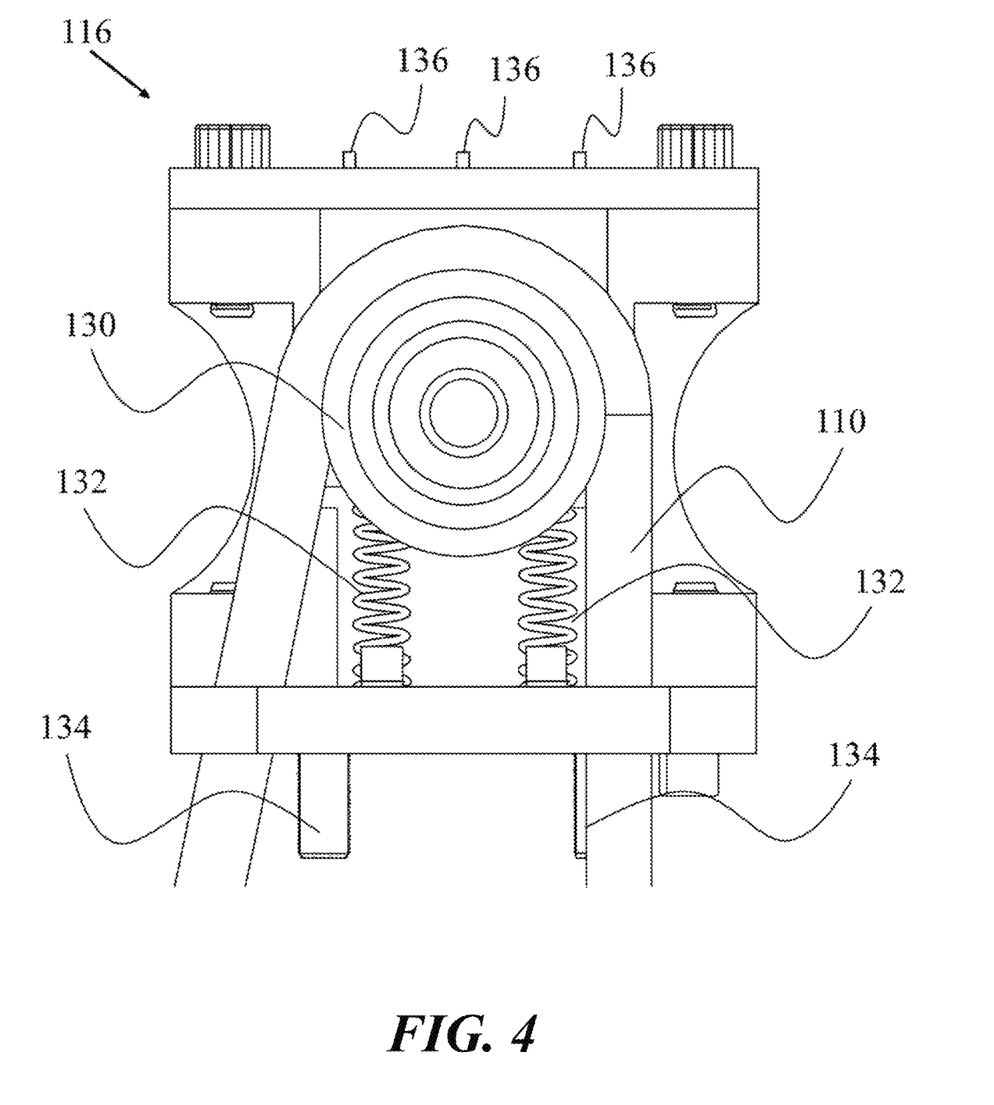
FIG. 4 is a front view of a tension sensor of a dimension monitoring apparatus, according to an embodiment of the present disclosure.
Figure 5:
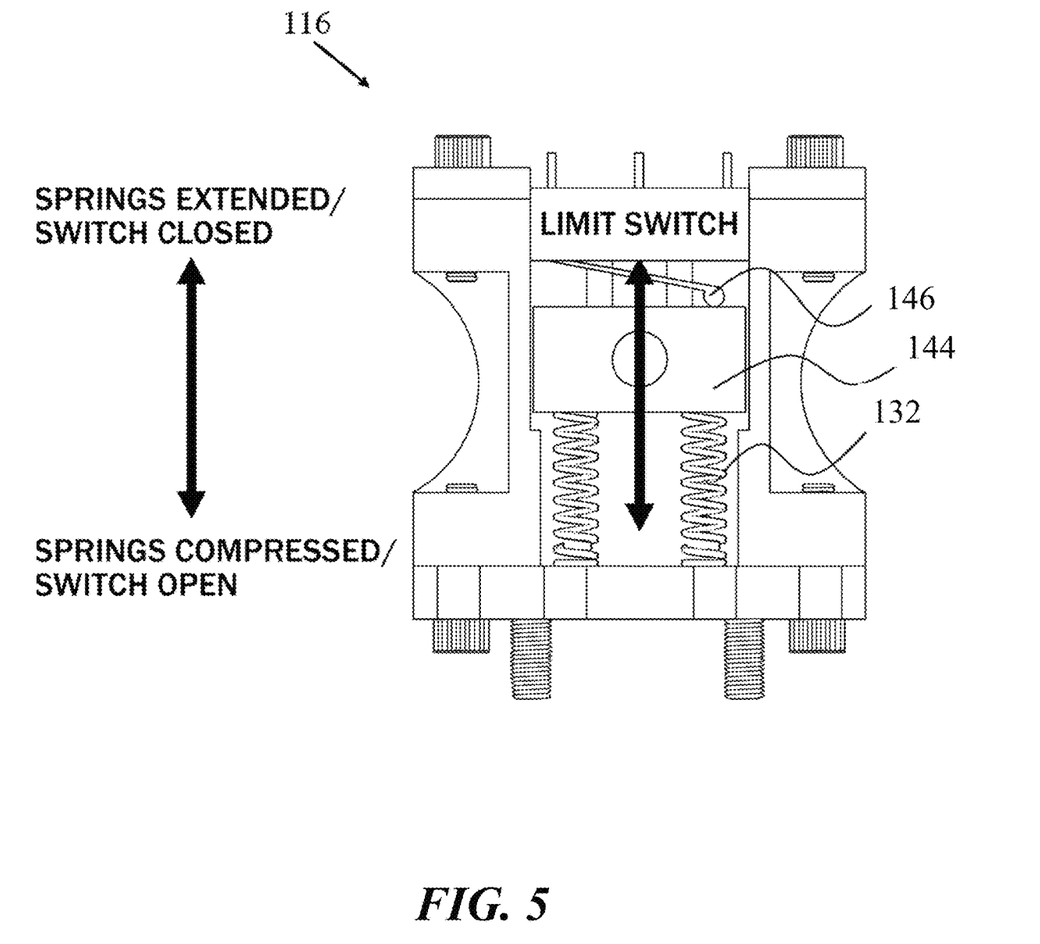
FIG. 5 is a front view of a limit switch and a limit switch operator of a tension sensor of a dimension monitoring apparatus, according to an embodiment of the present disclosure.
Figures 6A, 6B:
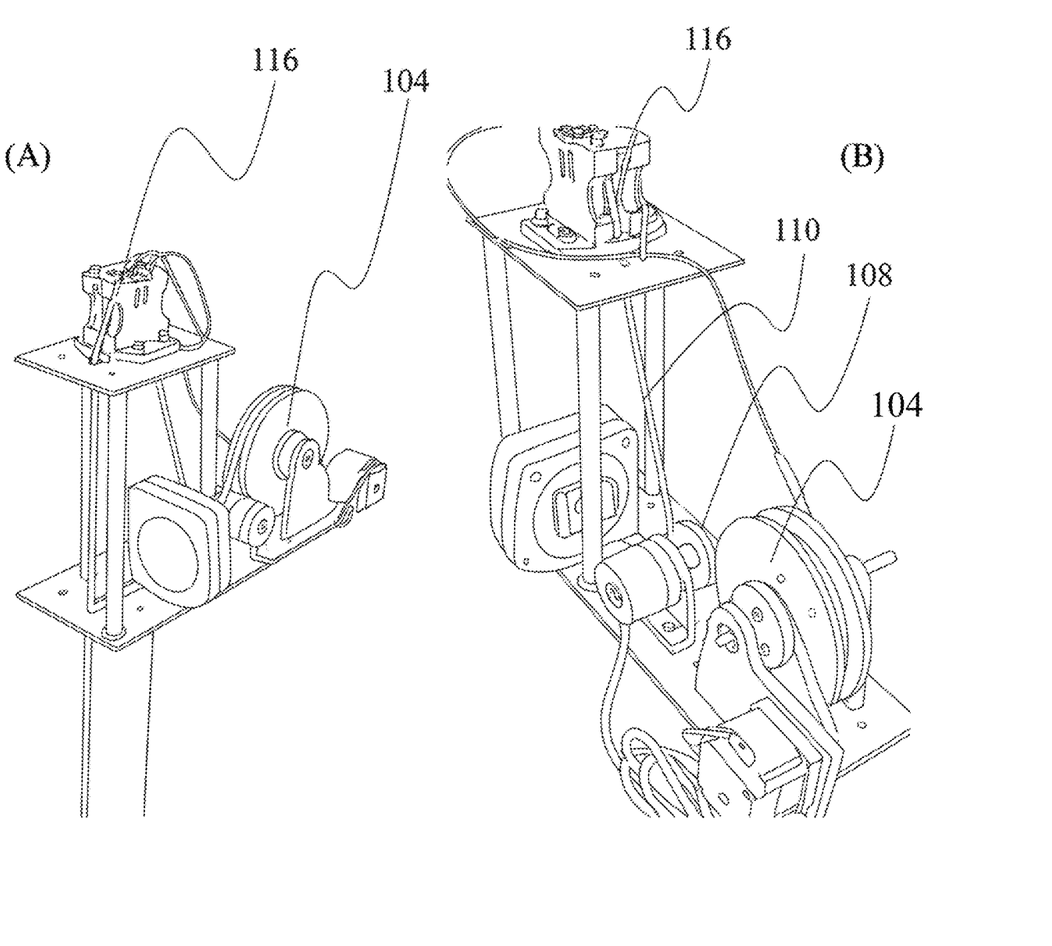
FIG. 6A is a side perspective view of the dimension monitoring apparatus in electrical communication with a computing device.
FIG. 6B is a rear perspective view of the dimension monitoring apparatus in electrical communication with a computing device.
Figure 7:
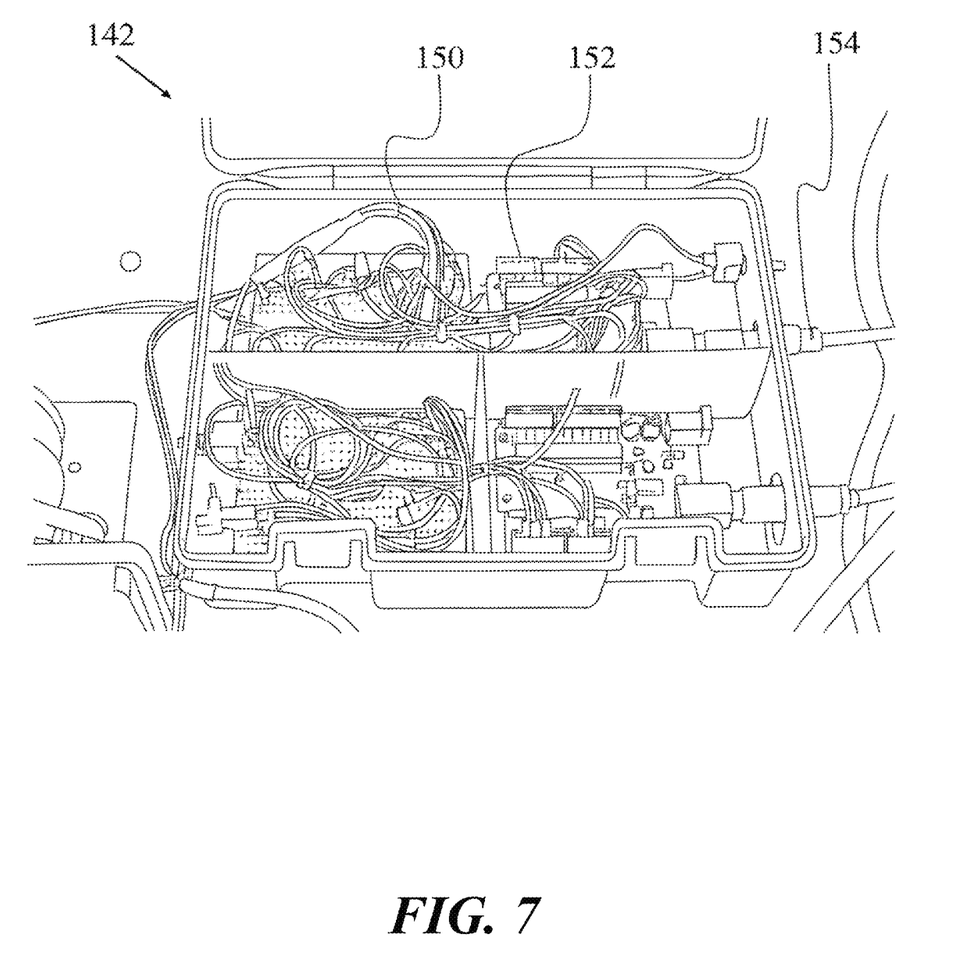
FIG. 7 is a perspective view of at least one electrical component of a dimension monitoring apparatus, according to an embodiment of the present disclosure.

FIG. 4 and FIG. 5, in conjunction with FIG. 1, FIGS. 6A-6B, FIG. 8 and FIG. 9, depict tension sensor 116, according to an embodiment of the present disclosure. In embodiments, tension sensor 116 may be configured to detect at least a negligible tension in cable 110 when cable 110 is attached to probe 138. In this manner, in these embodiments, as shown in FIG. 5, tension sensor 116 may comprise at least one spring 132 configured to exert a force upon limit switch operator 144, such that limit switch operator 144 may be translated toward limit switch 146, closing limit switch 146. As such, when limit switch 146 is closed, an electrical circuit may be closed, such that tension sensor 116 may transmit an electrical signal to the server, the third party database, and/or the computing device of dimension monitoring apparatus 100, via at least one electrical component 142, as shown in FIG. 7. In some embodiments, tension sensor 116 may comprise at least four springs 132 configured to translate limit switch operator 144 toward and/or away from limit switch 146.

For example, when probe 138 is connected to cable 110, such that there is tension in cable 110, the at least one spring 132 may be compressed, translating limit switch operator 144 away from limit switch 146 and opening the limit switch. Accordingly, in this example, the translation of limit switch operator 144 away from limit switch 146 may occur when cable 110 supports the weight of probe 138 (e.g., when probe 138 is not engaged with at least one surface of foundation 140). In this manner, in embodiments, the at least one spring 132 may expand as tension is decreased from cable 110 when probe 138 attached to cable 110 engages and/or abuts the rising foundation level. As such, the limit switch operator 144 may be translated toward limit switch 146, closing the limit switch 146 and the electrical circuit, allowing dimension monitoring apparatus 100 to send an electrical signal from tension sensor 116 to the server, the third-party database, and/or the computing device of dimension monitoring system 110, via at least one electrical connector 136. Furthermore, in embodiments, tension sensor 116 may be configured to be bolted via at least one attachment component 134 to an elevated platform of dimension monitoring apparatus 100, such that the at least one pulley 130 and/or probe 138 may be disposed directly above and/or centered within the shaft.

In some embodiments, tension sensor 116, the at least one spring 132, the limit switch operator 144, and/or the limit switch 146 may be constructed via 3D printing, such that tension sensor 116 may be configured to be housed in a 3D printed assembly. Furthermore, in some embodiments, the dimension monitoring apparatus may be constructed via 3D printing (e.g., standard PLA filament) and/or may be disposed upon at least one frame. Accordingly, as shown in FIGS. 6A-6B, in some embodiments, the at least one frame may be plasma cut from ⅛ in steel and/or the at least one frame and the dimension monitoring apparatus may be welded together.

FIG. 7, in conjunction with FIG. 1, FIG. 4, FIG. 5, FIGS. 6A-6B, FIG. 8, and FIG. 9, depicts at least one electrical component 142 of dimension monitoring apparatus 100, according to an embodiment of the present disclosure. Accordingly, in embodiments, motor assembly 102 may be in electrical communication with at least one processor 152, via at least one wire 150, via motor electrical component 124. Additionally, in these embodiments, the at least one processor 152 may be configured to be in electrical communication with the computing device of dimension monitoring apparatus 100 via at least one computing cable 154. Moreover, motor assembly 102 and tension sensor 116 may be in electrical communication with at least one processor 152, via the at least one wire 150, such that the electrical current provided to motor assembly 102 via at least one power source may increase and/or decrease based on feedback received from limit switch 146 of tension sensor 116. In addition, the at least one processor 152 may be configured to be in electrical communication with rotary encoder 108. Accordingly, motor assembly 102 may be configured to transmit at least one metric, including but not limited to, motor speed, current level, power level, and/or any motor metric known in the art to the at least one processor 152, via at least one wire 150 configured to be in electrical communication with at least one motor electrical component 124.

Moreover, in these embodiments, the at least one processor 152 may be configured to execute instructions, such that rotary encoder 108 and/or tension sensor 116 may be configured to transmit an electrical signal to the server, the third-party database, and/or the computing device of dimension monitoring apparatus 100, via the at least one computing cable 154. As such, the at least one processor 152 may be configured to constantly logs a time and/or rotary encoder data of rotary encoder 108 into the memory of the computing device, the server, and/or the third-party database.

In this manner, in embodiments, the at least one processor 152 may be configured to calculate a depth, an upward velocity of the flow, an area of the shaft at the current depth, a shaft radius, and/or any metric known in the art which may be used to calculate a dimension of foundation 140. Accordingly, as shown in FIG. 10, and FIGS. 11A-11C, in these embodiments, the recorded data and/or calculated data may be transmitted to the server, the third-party database, and/or the computing device, such that the at least one processor 152 may be configured to implement the recorded data and/or the calculated data into at least one graphical interpretation. In this manner, as shown in FIGS. 10-11C, a display device associated with the computing device may be configured to display, in real-time, the graphical interpretation of the recorded data and/or the calculated data. In some embodiments, the at least one processor 152 may be configured to transmit the recorded data and/or the calculated data into a spreadsheet (e.g., Microsoft Office Excel® spreadsheet). For example, the recorded data and/or the calculated data may be transmitted into the spreadsheet which may be preconfigured with a depth vs. radius graph to display the radius and/or depth data of foundation 140, in real-time.

Additionally, in embodiments, as shown in FIG. 8, probe 138 may be configured to be temporarily affixed to cable 110. In addition, probe 138 may comprise any shape known in the art which may allow probe 138 to engages and/or abut foundation 140, such that tension may be decreased in cable 110. For example, in these embodiments, probe 138 may be the shape of a cone. In some embodiments, probe 138 may comprise an arrow shape. Moreover, in embodiments, at least one portion of probe 138 may comprise any material known in the art, such that probe 138 may impart tension on cable 110, allowing limit switch operator 144 to translate away from limit switch 146 and/or compress the at least one spring 132. In some embodiments, at least one portion of probe 138 may comprise steel.

In embodiments, the at least one processor 152 may be in electrical communication with at least one foundation flow pump and/or at least one pump stroke sensor. In these embodiments, the at least one pump stroke sensor may comprise at least one strain gauge. As such, the at least one strain gauge may be configured to measure a level of strain associated with an aspect of the dimension monitoring apparatus 100 (e.g., a hose, a beam, cable 110, at least one pulley 130). In this manner, the at least one pump stroke sensor may be configured to monitor and/or record an expansion of the hose near the pump as compared to a predetermined circumference inputted into the at least one processor 152 of dimension monitoring apparatus 100. As such, each pump stroke will cause a slight expansion of the hose, which may be recorded and/or transmitted to the server, the third-party database, and/or the computing device of the dimension monitoring apparatus, such that a total amount of pump strokes may then be recorded. In this manner, in these embodiments, the at least one processor may be configured to calculate the shaft radius based on the recorded amount of pump strokes monitored by the at least one pump stroke sensor (e.g., a flow rate of foundation 140 being poured during construction).

Additionally, in embodiments, the at least one processor 152 of the dimension monitoring apparatus may be configured adjust the calculated data, in real-time, based on the depth of probe 138 (e.g., dynamic measuring). As such, in these embodiments, the dimension monitoring apparatus may comprise at least one cantilevered beam comprising the at least one pulley 130 affixed to an outward end. In addition, the cantilevered beam may also comprise at least one strain gauge in order to appropriately monitor the flow rate of foundation 140 being poured into the shaft. Furthermore, in these embodiments, when the weight of probe 138 is suspended, the cantilevered beam may be configured to flex, and that when the weight of probe 138 is supported by the rising foundation level, the beam deflection may decrease. As such, by utilizing the dynamic measuring, in these other embodiments, the dimension monitoring apparatus may be optimized to measure shafts with a depth greater than at least 100 ft.

Additionally, by knowing the strain induced on the cantilevered beam by probe 138 in open air, in embodiments, the at least one processor 152 may be configured to record and/or monitor at least one slurry density measurement at regular depth intervals throughout the length of the shaft. Accordingly, as used herein, the term "regular depth intervals" refers to any depth known in the art in which a measurement of foundation 140 may be taken in order to maintain the proper radius of foundation 140 within the shaft.

In embodiments, motor assembly 102 of dimension monitoring apparatus 100 may comprise a high-powered motor, such that probe 138 temporarily affixed to cable 110 required for shaft depths greater than at least 100 ft may be extended, retracted, and/or bobbed without increased strain to motor assembly 102. Moreover, in some embodiments, motor assembly 102 and spool 104 may be configured to be disposed within one housing of dimension monitoring apparatus, such that the housing may be affixed to the frame via at least one clamp. As such, in these other embodiments, the motor 102 and/or spool 104 may not be bolted and/or welded to the at least one frame.

In embodiments, the at least one processor 152 of dimension monitoring apparatus 100 may be configured to compare the recorded, monitored, and/or calculated data to at least one trained data set (e.g., a TIP dataset for foundation 140 with exact and/or similar schematics). In this manner, the at least one processor may be configured to determine whether a substantial match exists between the data of the at least one trained data set and the recorded, monitored, and/or calculated date of dimension monitoring apparatus 100. Accordingly, in these embodiments, if a substantial match exists between the data of the at least one trained data set and the recorded, monitored, and/or calculated data of dimension monitoring apparatus 100, the processor may be configured to transmit a notification indicative of validating the appropriate radius and/or metric of foundation 140. Additionally, the at least one processor 152 may then be configured to output at least one graphical interpretation of the recorded, monitored, and/or calculated data on the display device associated with the computing device of dimension monitoring apparatus 100.

In this manner, in embodiments, if a substantial match does not exist between the data of the at least one trained data set and the recorded, monitored, and/or calculated data of dimension monitoring apparatus 100, the processor may be configured to transmit a notification indicative of a warning stating that the appropriate radius and/or metric of foundation 140 has not been met and/or is not correct. As such, in these embodiments, the at least one processor 152 may be configured to cease electrical current to the at least one foundation flow pump, until dimension monitoring apparatus 100 determined that the appropriate radius and/or metric of foundation 140 has been met as compared to the at least one trained data set, via tension sensor 116 and/or rotary encoder, in addition to the strain gauge. The data collected will then be compared to TIP data for validation.

Method of Use:

FIG. 12, in conjunction with FIGS. 1-11C, process flow diagram depicting a method of verifying at least one dimension, in real-time, of a foundation being poured during construction, via a dimension monitoring apparatus, according to an embodiment of the present disclosure. The steps delineated in FIG. 12 are merely exemplary of an order of verifying at least one dimension of a foundation being poured during construction. The steps may be carried out in another order, with or without additional steps included therein.

As shown in FIG. 12, in conjunction with FIGS. 1-11C, the method 200 begins at step 202, in which dimension monitoring apparatus 100 comprising a computing device in electrical communication with the at least one processor 152 is provided for shaft analysis. In embodiments, this step may include the at least one processor 152 being in electrical communication with motor assembly 102, tension sensor 116, and at least one strain gauge. As such, electrical signals transmitted from tension sensor 116 and the at least one strain gauge may then be stored within the memory of dimension monitoring apparatus, such that the at least one processor 152 may access the memory prior to calculating a dimension of foundation 140 and/or comparing the calculated dimension with a predetermined dimension of foundation 140 of at least one trained dataset.

Next, at step 204, the at least one processor 152 of dimension monitoring apparatus 100 executes instructions to activate motor assembly 102, such that motor assembly 102 may extend and/or retract probe 138 so that probe 138 abuts at least one portion of a surface of poured foundation 140. Further, at step 206, the at least one processor 152 may be configured to provide electrical current to motor assembly 102, such that probe 138 may be extended, retracted, and/or bobbed, such that the at least one portion probe 138 may engage the at least one surface of poured foundation 140 as is rises within the saft. In addition, at step 208, tension sensor 116 may be configured to detect a metric (e.g., upward velocity, shaft depth, and/or shaft radius) based on an increase and/or decrease of tension that opens and closes limit switch 146, such that tension sensor 116 sends an electrical signal to the at least one processor. Next, at steps 210, 212, and 214, in these embodiments, the at least one processor 152 may be configured to calculate a dimension of foundation 140 and then compare the calculated foundation dimension to a predetermined foundation dimension of at least one trained dataset (e.g., dataset of TIP testing on foundation 140 with exact and/or similar schematics). Finally, method 200 then proceeds to either step 216 or step 218 depending on whether a substantial match exists between the calculated dimension and the predetermined dimension.

During step 216, in embodiments, the at least one processor 152 of dimension monitoring apparatus 100 may determine that a substantial match does exist between the aspect of the application and the predetermined aspect of the application. As such during step 216, the at least one processor 152 of dimension monitoring apparatus 100 may be configured to execute instructions to activate a notification indicative of verifying the appropriate dimension of poured foundation 140 and/or shaft. Therefore, dimension monitoring apparatus may provide at least one graphical interpretation of the at least one dimension (e.g., plot of depth profile of foundation 140) on a display device associated with the computing device.

During step 218, in embodiments, the at least one processor 152 of dimension monitoring apparatus 100 may determine that a substantial match does not exist between the aspect of the application and the predetermined aspect of the application. Accordingly, during step 218, the at least one processor 152 of dimension monitoring apparatus 100 may execute instructions to transmit a notification indicative of an incorrect dimension of foundation 140 and/or transmit a notification indicative of a warning of the incorrect foundation dimensions. Furthermore, in some embodiments, dimension monitoring apparatus 100 may be in electrical communication with the at least one foundation pourer, such that when the notification indicative of a warning is transmitted, the at least one processor 152 of dimension monitoring apparatus may be configured to cease providing electrical current to the foundation pourer, halting the flow rate and/or pouring of the foundation via the foundation pouring.

The following examples are provided for the purpose of exemplification are not intended to be limiting.

EXAMPLES

Example 1

Validation of Drilled Shaft Dimensions During Construction

For validating a dimension of foundation 140 being poured during construction, as shown in FIG. 9, in conjunction with FIGS. 1-8 and FIGS. 10-11C, foundation 140 (e.g., a large concrete block) was lifted with an overhead crane to mimic the rise of foundation 140 in a drilled shaft at a constant velocity. The dimension monitoring apparatus is configured to have the probe touches off the first point and sets this distance as the datum. This allows the subsequent points to reference the datum regardless of where the probe starts from.

Foundation 140 was raised 60 in at a rate of 0.5 in/sec. Three tests were conducted, a control where the block was raised at 0.5 in/sec throughout the entire 60 in. Then foundation 140 was slowed down in the middle, to mimic a slower foundation level rise. During the third test, foundation 140 was sped up in the middle, mimicking a faster foundation level rise. A mock foundation flow rate down the tremie pipe of 200 in^3/sec was used when testing to evaluate the effects of foundation level velocity change exclusively. A slower rise of foundation 140 will correspond to a larger shaft radius (e.g., foundation dimension) at that respective depth. A tape measure was used on the right side of foundation 140 to verify the velocity measurements calculated by dimension monitoring apparatus 100.

The three tests showed that dimension monitoring apparatus 100 could accurately measure depth, and the corresponding velocity of foundation 140. The constant velocity test is labeled Control, the test with a velocity decrease in the middle is labeled Radius Expansion, and the test with a velocity increase in the middle is labeled Radius Reduction. As shown in FIG. 10, the calculated radius was plotted against the depth of the model drilled shaft. The three depth profiles obtained from the three tests were overlaid.

The three tests show strong agreement on the velocity and subsequent shaft radius during the period of constant velocity, between depths of 60 in and 30 in. Furthermore, the increase in upward velocity correctly corresponds to a reduction in shaft radius, and vice versa. As shown in FIGS. 11A-11C, the radius data from the three tests was then mirrored about the y-axis to visualize the shaft profile as a function of depth.

The dimension monitoring apparatus was successfully able to measure the length of cable 110 expended and the contact with the rising foundation level. Using this data along with an assumed constant foundation flow rate, shaft radius was calculated. Additionally, the dimension monitoring apparatus assumed a constant foundation flow rate down the pouring shaft.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. A dimension monitoring apparatus for verifying, in real-time, a dimension of a concrete foundation being poured during construction, the dimension monitoring apparatus comprising:
    a spool having a distal portion and a proximal portion separated by a first distance;
    a cable moveably connected to the spool, cable configured to be retained within the first distance of the spool, wherein the cable comprises a proximal end and a distal end;
    a probe temporarily affixed to the distal end of the cable, wherein at least one portion of the probe is configured to engage at least one surface of the foundation;
    a rotary encoder comprising at least one wheel, the at least one wheel configured to be in contact with at least one portion of the cable, wherein a relative linear distance, relative direction, or both of the at least one portion of the cable is recorded in real-time via passive tracking by the clockwise rotation, counterclockwise rotation, or both of the at least one wheel as the cable extends, retracts, or both;
    a tension sensor comprising at least one pulley, the at least one pulley configured to be in contact with at least one portion of the cable, wherein the at least one pulley is temporarily affixed to at least one spring, whereby when the at least one portion of the probe is disengaged with the at least one surface of the foundation, the at least one spring is configured to decompress, thereby translating the at least one pulley toward a limit switch of the tension sensor, and wherein when the at least one pulley arrives at a predetermined end position, a circuit of the limit switch is closed;

a motor assembly configured to be in mechanical communication with the spool, wherein the motor assembly is configured to extend, retract, or both the cable, via rotatably translating the spool;

an electronic circuitry, the electronic circuitry configured to selectively supply an electric current the rotary encoder, the tension sensor, or both;

a processor in electrical communication with the electronic circuitry, the motor assembly, or both, wherein the processor is configured to actuate the motor assembly and to cause the electronic circuitry to supply the electric current to the rotary encoder, the tension sensor, or both, thereby causing the cable to extend, retract, or both at a predetermined speed, such that the probe engages, disengages, or both with the at least one surface of the foundation, thereby closing, opening, or both the circuit of the limit switch and causing the tension sensor, the rotary encoder, or both to send at least one electrical signal to the processor; and wherein the processor is further configured to, after the probe is retracted a predetermined distance from the foundation, cause the motor assembly to re-extend the cable such that the probe reengages the at least one surface of the foundation, and wherein when the at least one portion of the probe reengages with the at least one surface of the foundation, the motor assembly is deactivated.

2. The dimension monitoring apparatus of claim 1, further comprising a computing device configured to be in electrical communication with the processor, wherein the processor is configured to transmit the at least one electric signal of the tension sensor, the rotary encoder, or both, to a memory of the computing device.

3. The dimension monitoring apparatus of claim 2, wherein the processor is configured to calculate at least one dimension of the foundation, in real-time based on the electrical signal of the tension sensor, the rotary encoder, or both.

4. The dimension monitoring apparatus of claim 3, further comprising a display device associated with the computing device, wherein the processor is configured to display a graphical interpretation of the at least one calculated dimension of the foundation, in real-time.

5. The dimension monitoring apparatus of claim 1, wherein the probe is configured to input a tension into the cable as the probe is disengaged with the at least one surface of the foundation.

6. The dimension monitoring apparatus of claim 1, wherein the at least one wheel of the rotary encoder comprises a steps per revolution of at least 1200 steps per revolution.

7. The dimension monitoring apparatus of claim 1, wherein the foundation is poured at a depth of at least 100 ft.

8. A method for verifying, in real time, a dimension of a foundation being poured during construction, the method comprising:

temporarily affixing a probe to a distal end of a cable of a dimension monitoring apparatus, the dimension monitoring apparatus comprising a spool, whereby the cable is moveably connected to the spool, wherein the spool is in mechanical communication with a motor assembly, whereby the motor assembly is configured to extend, retract, or both the cable, via rotatably translating the spool, through at least one wheel of a rotary encoder, at least one pulley of a tension sensor, or both of the dimension monitoring apparatus, and wherein the rotary encoder is configured to transmit an electric signal as at least a portion of the cable translates over the at least one wheel of the rotary encoder;

extending, via the motor assembly, the cable away from the spool toward the foundation, wherein when at least one portion of the probe engages with at least one surface of the foundation, a supply of an electric current to the motor assembly ceases, thereby causing the cable to cease translating, and wherein when the at least one portion of the probe engages with the at least one surface of the foundation, the tension sensor is configured to transmit at least one electric signal;

retracting, via the motor assembly, the cable toward the spool, wherein subsequent to the at least one portion of the probe engaging with the at least one surface of the foundation, the supply of electric current to the motor assembly is provided, whereby the rotation of the motor assembly is reversed, thereby causing the cable to begin translating toward the spool; and reextending, via the motor assembly, the cable away from the spool toward the foundation, wherein subsequent to the probe being retracted a predetermined distance, providing the supply of electric current to the motor assembly, whereby the rotation of the motor assembly is forward, thereby causing the at least one portion of the probe to reengage with the at least one surface of the foundation, and wherein when the at least one portion of the probe reengages with the at least one surface of the foundation, the motor assembly is deactivated.

9. The method of claim 8, wherein the rotary encoder is configured to record a relative linear distance, relative direction, or both of at least one portion of the cable in real-time via passive tracking by the clockwise rotation, counterclockwise rotation, or both of the at least one wheel as the cable extends, retracts, or both.

10. The method of claim 9, further comprising the step of, transmitting, via a processor of the dimension monitoring apparatus, the at least one electrical signal of the rotary encoder, the at least one electrical signal of the tension sensor, or both to a memory of a computing device.

11. The method of claim 10, further comprising the step of, after transmitting, the at least one electrical signal of the rotary encoder, the tension sensor, or both, calculating, via the processor of the dimension monitoring apparatus, at least one dimension of the foundation based on the at least one electrical signal of the rotary encoder, the at least one electrical signal of the tension sensor, or both.

12. The method of claim 11, further comprising the step of, after calculating the at least one dimension of the foundation, displaying, via the processor of the dimension monitoring apparatus, a graphical interpretation, in real-time, of the at least one calculated dimension of the foundation.

13. The method of claim 8, wherein the probe is configured to input a tension into the cable as the probe is disengaged with the at least one surface of the foundation.

14. The method of claim 8, wherein the at least one wheel of the rotary encoder comprises a steps per revolution of at least 1200 steps per revolution.

15. The method of claim 8, wherein the foundation comprises concrete.

* * * * *